INVENTOR
Howard E. Somes

Patented Mar. 12, 1946

2,396,613

UNITED STATES PATENT OFFICE 2,396,613

APPARATUS FOR HEAT-TREATING ARTICLES

Howard E. Somes, Detroit, Mich., assignor to Budd Induction Heating, Inc., Philadelphia, Pa., a corporation of Michigan Original application October 18, 1941, Serial No. 415,580. Divided and this application August 6, 1942, Serial No. 453,781

2 Claims. (Cl. 219—13)

This application is a division of my application Serial No. 415,580, filed October 18, 1941.

This invention relates to an apparatus for hardening a workpiece and has for an object to provide improvements for obtaining a simpler and more convenient apparatus as well as a better product. Another object is to minimize the danger of the work being distorted under high gripping stress while the portion to be hardened is heated to a hardening temperature where it is somewhat more plastic under lower stress than when cold. Yet a further object is to provide heavy gripping pressure for holding the work while being operated on. Yet a further object is the provision of a motor actuated non-rotatable mechanism which is adapted to open and close the gripping portions of a chuck-like rotatable workholder.

Referring to the drawings.

Figure 1:
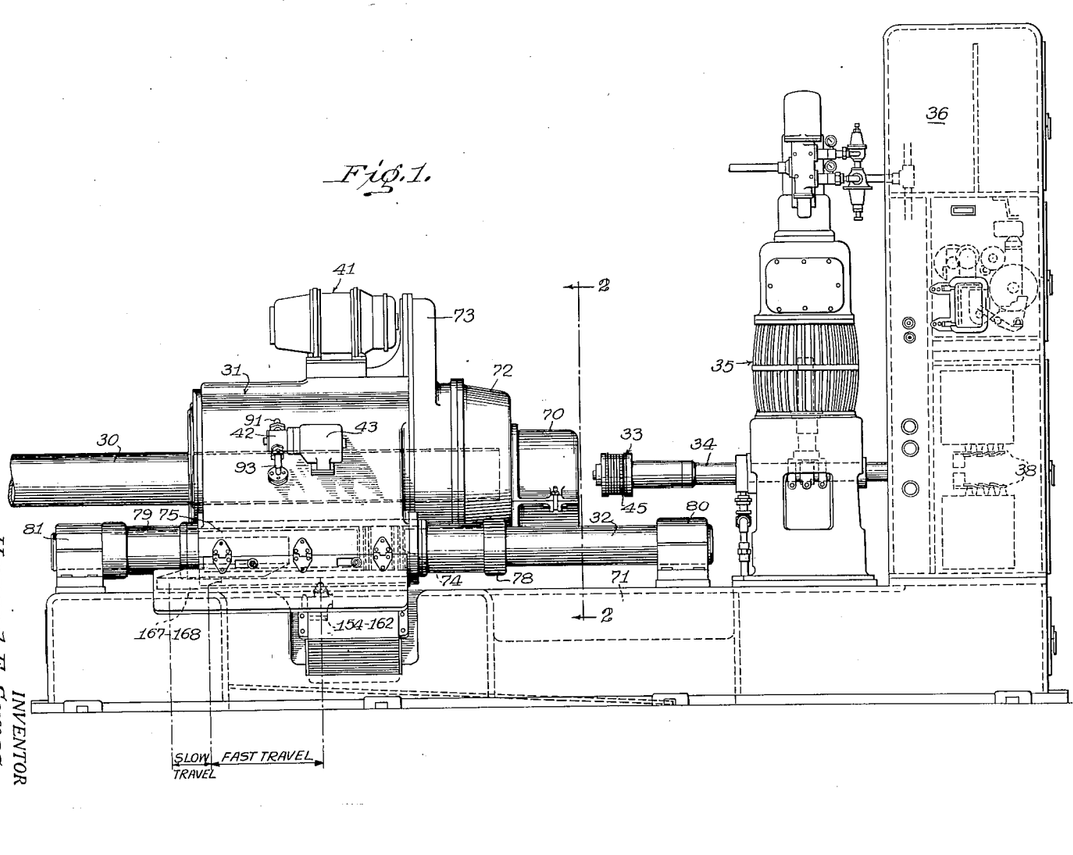
Fig. 1 is a side view of the apparatus, apart from the control valves and the like which are not shown.
Figure 2:
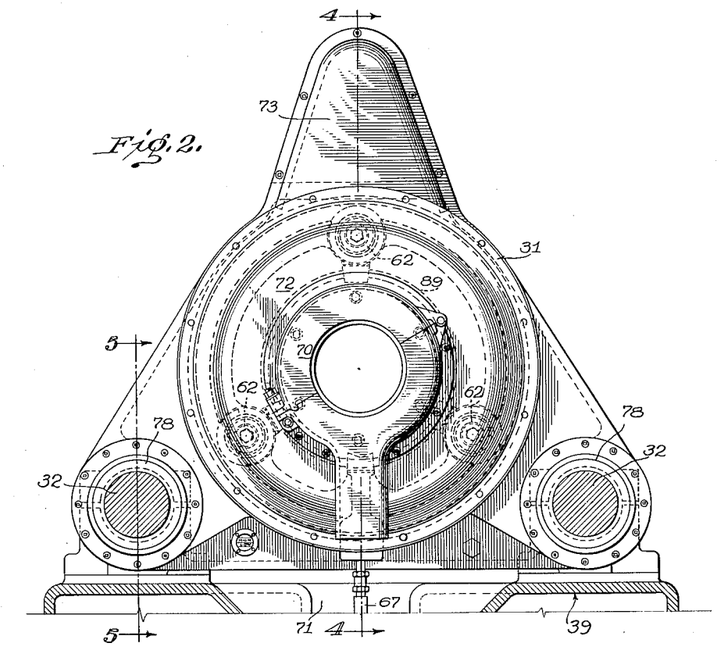
Fig. 2 is a section on the line 2—2 of Fig. 1.
Figure 3:
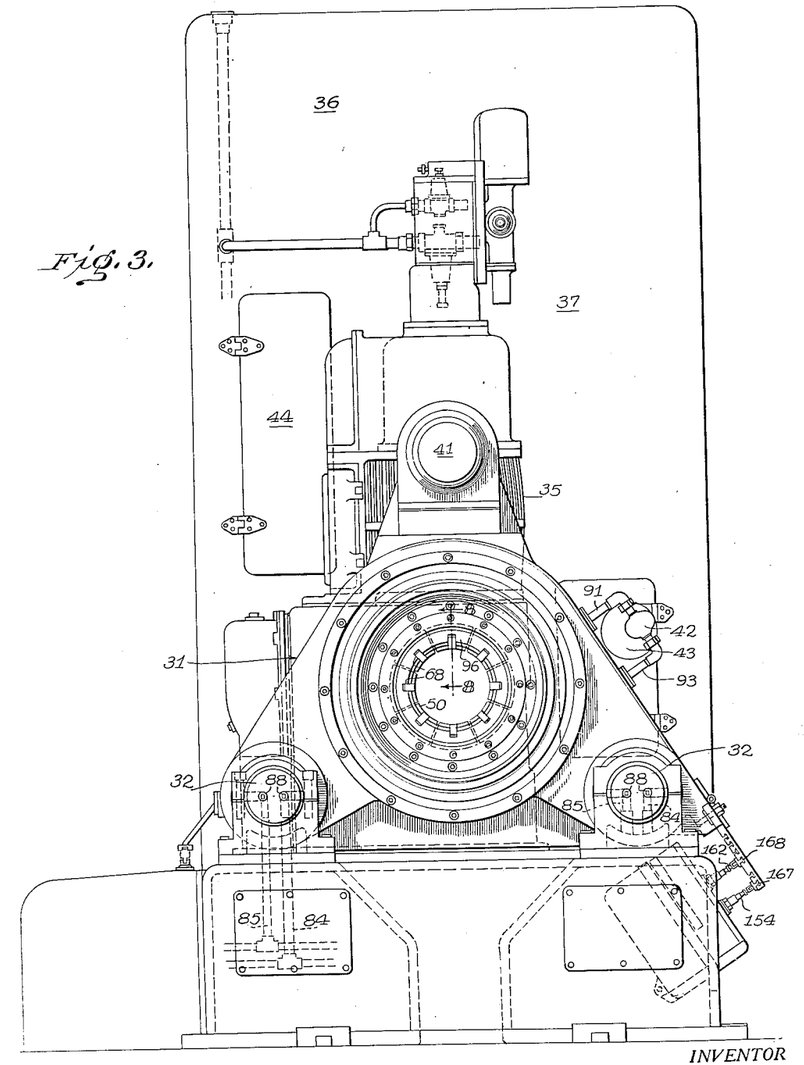
Fig. 3 is a left-side view of the device of Fig. 1 with the work removed.

A workpiece such as a long section of pipe 30 of the type used in oil wells and lines is adapted to be gripped by a workholder within the enclosure 31 so that the inner surface of an end portion of the work may be heated by electromagnetic induction and hardened by prompt quenching with water or other appropriate cooling fluid. The workholder in the embodiment illustrated is slidable on the spaced guides 32 for cooperation with an inducing head 33 which is shown as fixed on the supporting arbor 34, the head being supplied with high-frequency alternating current from the transformer within the casing 35. This transformer is similar in construction and operation to that shown and described in my prior application Serial No. 392,867, for "Heat treating apparatus," filed May 10, 1941. Within the upper portion of the housing to the right of the transformer housing in Fig. 1 are located a plurality of relays 36 which are responsive to a timing and sequence controller 37 located below them. Below the sequence controller are a number of capacitors 38 for the usual purposes such as improving the power factor of the inductive load. The two small circles shown to the left of the sequence controller are indicating lights for the operator. The three knobs or buttons shown to the left of the capacitors in Fig. 1 are for manually starting and stopping the repeating cycles of operation, the lower one being for starting the automatic time controlled cycle of operations while the top one is for stopping. The intermediate knob is a manual control whereby the heat may be manually turned off the inducing head. The entire apparatus shown in Fig. 1 is illustrated as being mounted on a cast iron bed or frame 39. On top of the enclosure 31 is an electric motor 41 for rotating the workholder and work during the heating and quenching operations to assist in obtaining uniformity in heating and hardening. An oil pump 42 located on the side of the enclosure 31 is driven by a suitable motor 43. In Fig. 3 a door 44 provides access to the fuses located at one side of the sequence or timing controller 37.

Figure 4:
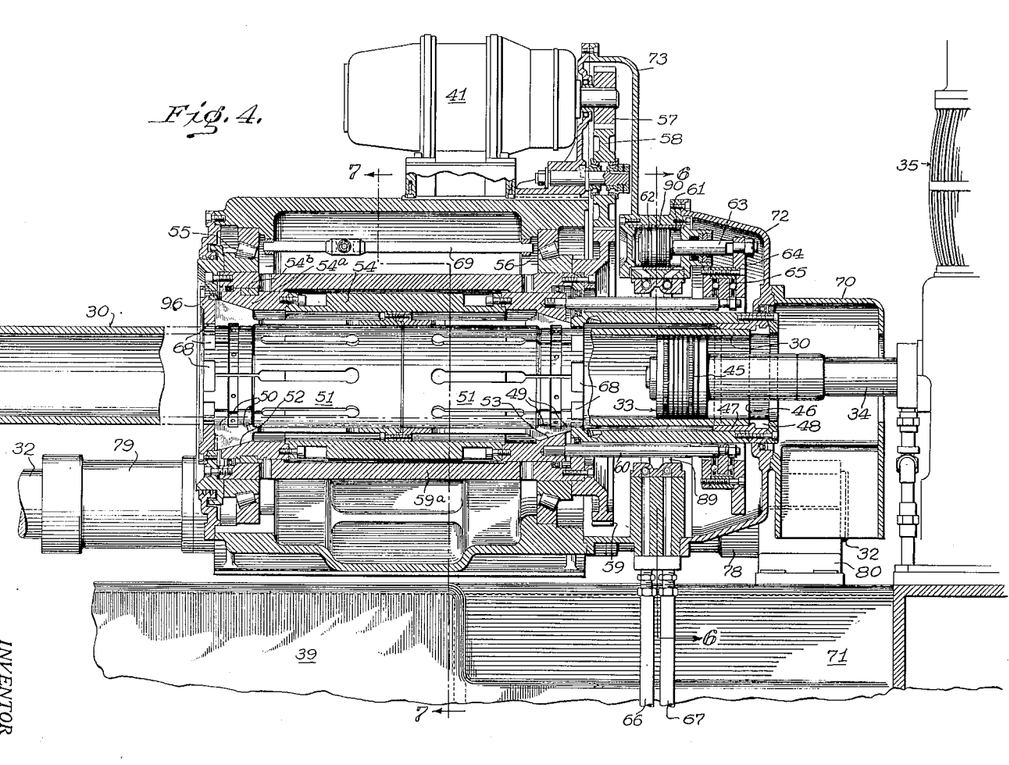
Fig. 4 is a section on the line 4—4 of Fig. 2.

As shown in Fig. 4, located on the supporting side of the inducing head 33 is a quenching nozzle 45. The work 30 is moved into the holder until it engages the stop or button wall 46 on a member of the shape illustrated to constitute a guide 47 for the outer surface of the work, the end of the guide away from the stop being beveled as illustrated to assist in centering the work. A radially laminated ring 48 carried by the members 46 and 47 serves as the usual end extension for directing magnetic flux from the work into the inducing head when adjacent thereto.

The work clamping portions 49 and 50 of the chuck or collet sleeve are mounted on the ends of resilient fingers 51 and are provided with cam surfaces 52 and 53 which cooperate with corresponding inclined or cam surfaces at the ends of the slidable cam actuating ring 54. The cam surfaces of this ring are formed on hardened end extensions 54a which are bolted to the ring 54. A key 54b causes the cam end 54a and its surrounding power-driven ring to rotate together upon rollers or other type anti-friction bearings 55 and 56. The gear 57 on the shaft of the motor 41 engages the idler gear 58 journalled on the shaft 58a which drives the large gear 59 for rotating the power-driven ring 59a. For longitudinally or axially shifting the cam ring 54, a plurality of rods 60 engage the cam ring to push or pull it by force from the fluid pressure motors comprised of at least two or more angularly spaced cylinders 61 in which are pistons 62 whose piston rods 63 are connected to the non-rotatable thrust ring 64 and this ring being connected as shown to transmit thrusts through the antifriction bearings illustrated to the rotatable thrust ring 65 to which the rods 60 are connected. Fluid pressure pipes 66 and 67 are connected to the several cylinders 61. The valves controlling these fluid pressure pipes and cylinders are responsive to the timing and sequence controller. Additional keys 68 are engaged in notches in the collet ends for keying the work grippers to the power-driven ring 59a through the end connections shown at the left in Fig. 4. A lubricating oil pipe 69 supplies the roller bearing and collet lubrication. Since the quenching nozzle 45 is located on the right of the inducing conductors 33 the work is caused to travel toward the right, the right end portion of the work being heated first. This relative translation between the inducing head and work takes place by movement of the entire workholder upon the guides 32 while the inducing head remains stationary. In addition to this translation of the work for heating, the work and its holder are rotated to obtain greater uniformity in heating and hardening. After being heated the water or other quenching fluid is forced out of the quenching nozzle 45 so as to be directed away from the inducing head and under pressure sufficient to push the quenching liquid out from the space between the supporting arbor and the work into the protecting hood 70 from which it falls into the sump 71. From the sump the quenching liquid may be filtered, cooled and used again. For work of different diameters than that illustrated, the inducing head as well as the quenching nozzle are removable in order that a head and nozzle of the right size may be substituted. The casing portion 72 surrounds the thrust bearing between the hood 70 and another casing portion 73 encloses the driving gears.

Figure 5:
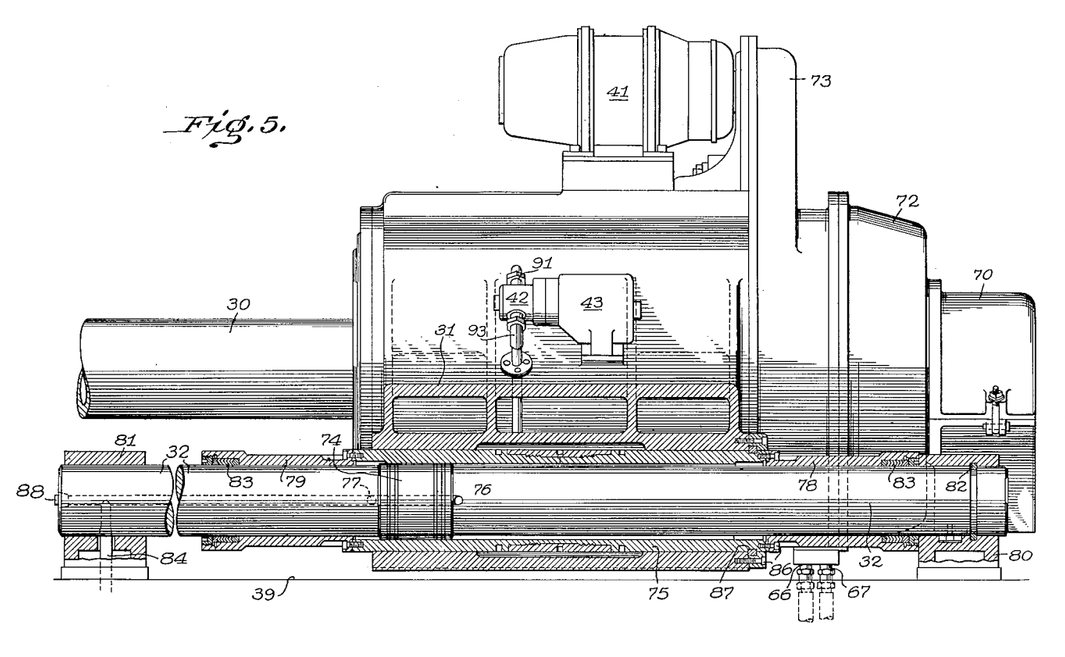
Fig. 5 is a section on the line 5—5 of Fig. 2.

From Fig. 5 it may be seen that the pistons 74 on the guides 32 are fixed to cause sliding movement of the cylinders 75 which are only of slightly larger diameter than the guides 32. For movement of the cylinders 75 and the enclosure 31 to the left, pressure fluid enters the cylinder through the port 76 and for movement of the cylinder to the right the pressure fluid enters through the port 77 shown in dotted lines. At each end of the cylinder are shown elongated heads 78 and 79 which constitute bearing portions for supporting the workholder and also contain packing 83 to prevent leakage of the pressure fluid from within the cylinder 75. The guides are fixed within end supports 80 and 81, a ring 82 serves to key the guides to their end supports to prevent longitudinal movement of the guides. These end supports are preferably constructed in two parts as shown in Fig. 3. The amount of pressure fluid for sliding the workholder on the guides is accurately controlled from the timing sequence mechanism 37 through valves not shown and a source of fluid pressure also not shown. The fluid pressure for the cylinder 75 is supplied through connections 84 and 85 and passages within the guides. Bolts 86 secure the bearing heads 78 and 79 and the cylinders 75 to the frame of the enclosure 31 as shown in Fig. 5. A key 87 insures movement of the cylinder 75 with the heads regardless of the direction of movement. Plugs 88 close the ends of the fluid pressure passages within the guides.

Figure 6:
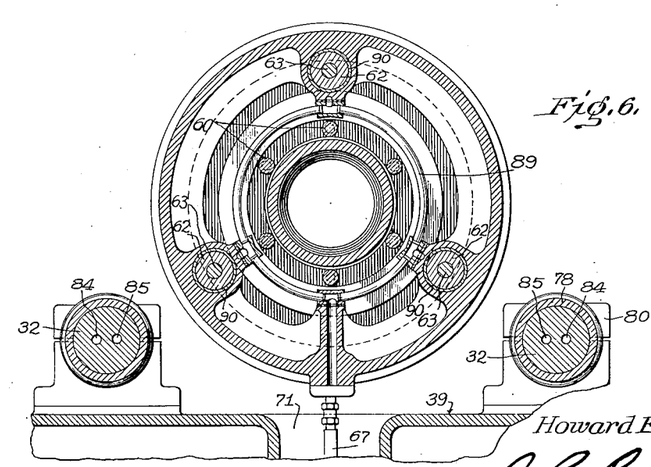
Fig. 6 is a section on the line 6—6 of Fig. 4.

Fluid pressure pipes 89 connect the cylinders 61 with the fluid pressure connections 66 and 67. The cylinders 61 are shown as being provided with a hardened wear-resisting liner 90 as shown in Figs. 4 and 6.

Figures 7, 8, 9, 10:
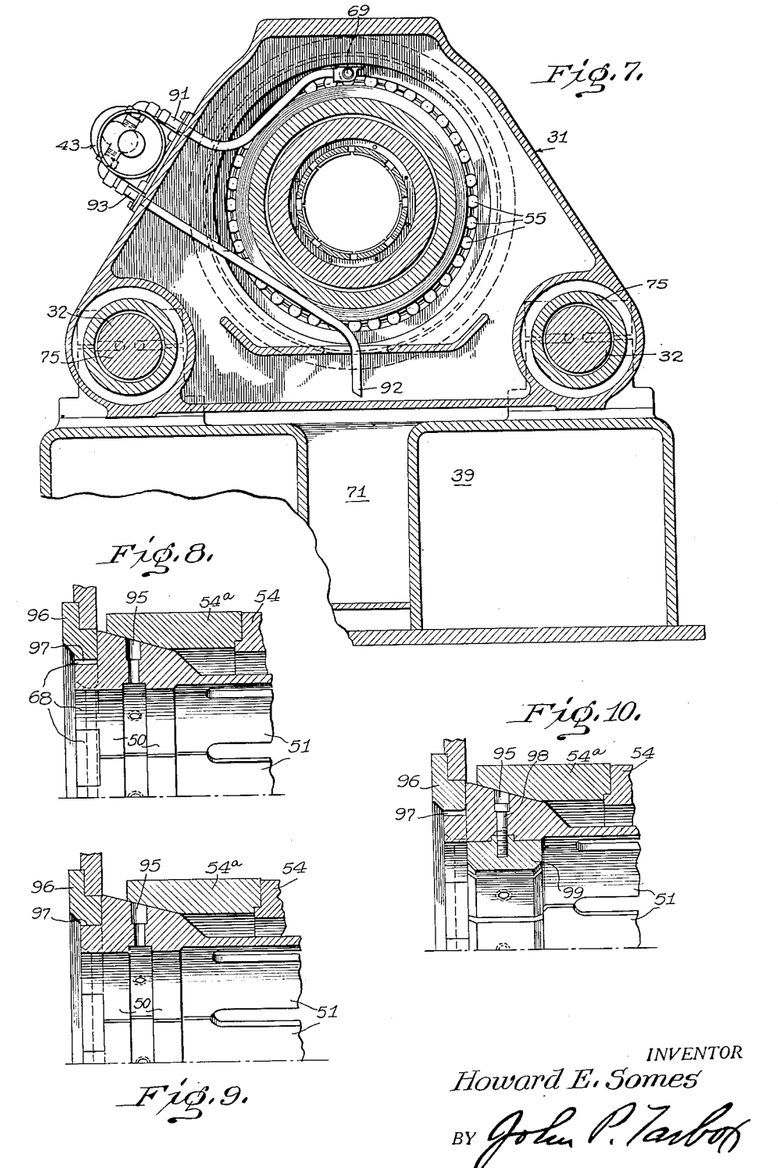
Fig. 7 is a section on the line 7—7 of Fig. 4.
Fig. 8 is a section on the line 8—8 of Fig. 3.
Fig. 9 is a view corresponding to Fig. 8, but showing the collet or work gripping means expanded.
Fig. 10 is a view corresponding to Fig. 8, but showing the addition of pads for engagement with work of a smaller diameter.

A pipe 91 for lubricant leads from the pump 42 to the pipe 69 shown in Figs. 4 and 7, while a suction pipe 93 leads from an oil pump 92 back to the pump.

For work of maximum size the clamping portions 50 are caused to move radially inward for gripping the work tightly by a movement of the cam ring 54 and its end extensions 54a to the left. The work is clamped by the cam ring having been moved far enough for that purpose as shown in Fig. 8, while in Fig. 9 the cam ring is moved to the right allowing the work clamping portions 50 to expand and substantially close the space 97 between the non-expansible end ring 96 and the work gripping portion. For large size work a bolt hole 95 is not used, but where smaller diameter work is to be hardened, pads 99 are secured to the work gripping portions by bolts 98 as shown in Fig. 10. The radial depth of the pads or blocks 99 will depend on the diameter of the work being operated on.

An electric motor 150 (see Fig. 11) drives an oil pump 151 for supplying oil through the fourway open-center valve 152 and the pipe line 153, through the shut-off valve 154. A piston valve 155 is normally held open by the spring 156 allowing free passage of the oil through it, a roller 157 bearing against the cylinder 75. With the shut-off valve 154 open as illustrated, oil then flows through the pipe 158 and the counter-balance valve 159 and pipes 84 through the cylinder ports 76 to the cylinders 75 for moving the cylinders 75 on the guides 32. While the oil is flowing into the cylinders through the pipes 84, such liquid is being ejected from the cylinders on the opposite sides of the pistons 74, through the pipes 85, through the counter-balance valve 160, pipe 161, shut-off valve 162, pipes 163 and 164, valve 152 and pipe 165 into the oil tank 166. Fixed with respect to the cylinders 75 are the cam blocks 167 and 168 which are adapted to be engaged by the rollers of the shut-off valves 154 and 162 and close such valves. When the shut-off valve 154 is closed, oil or other fluid being used passes through the reduced flow valve 169, thence through the counter-balance valve 159 into the cylinders 75 by way of the supply pipes 84. During the time that oil is flowing into one end of the cylinders 75 it is flowing out of the other end. Both shut-off valves 154 and 162 are simultaneously actuated by the cam blocks 167 and 168.

Figure 11:
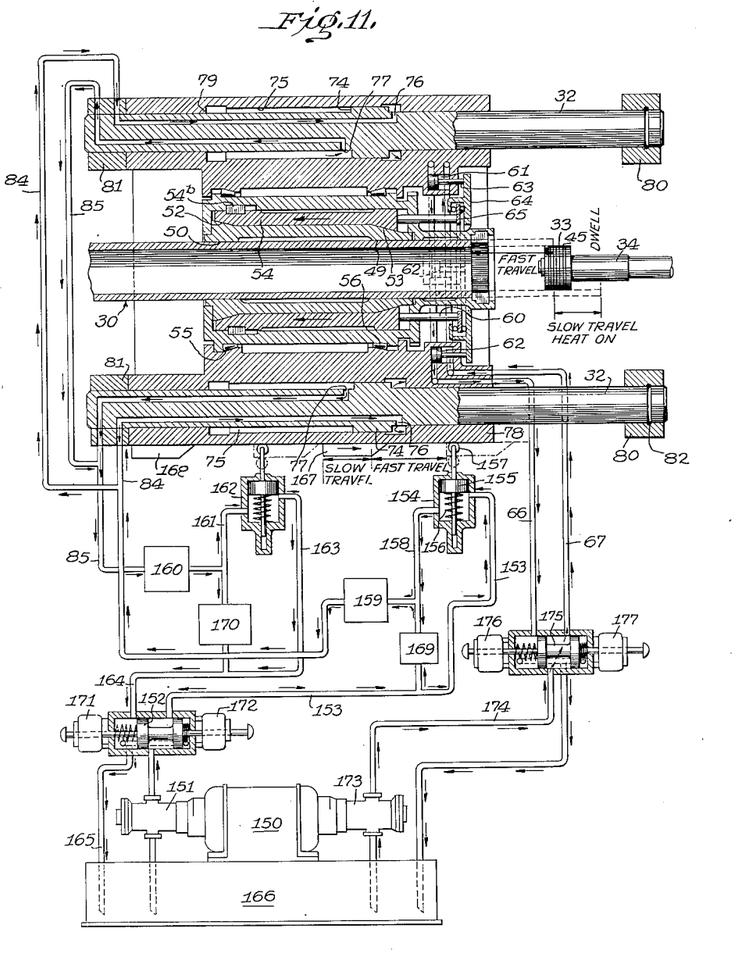
Fig. 11 is a diagrammatic view of the hydraulic circuits for translating the workholder and for clamping and unclamping it.

When the work and its clamping means reaches the end of its travel, the timing and sequence controller actuates solenoid 171 to shift the valve 152 for causing oil to flow from the pump 151 through the pipes 164, 163, shut-off valve 162, counter-balance valve 160, pipes 85 into the opposite end of the cylinders 75. The flow of oil through the reduced flow valves 169 and 170 results in the movement of the workholder carriage along the guides 32, being much slower than is the movement when the cam blocks 167 and 168 are not engaged by the rollers of the shut-off valves. As the work is moved from left to right in the portion of travel marked on the drawing of Fig. 18 as "slow travel," the sequence controller actuates the current controls for supplying inducing current to the head 33. When the work is heated to the desired axial length, adjustable stops cause the fluid pressure to be cut off from the translating cylinders 75, stopping the relative movement between the work and the inducing and quenching heads. The work is next caused to reverse its direction and move from right to left.

Where the work is of the character such that further heat treatment may be desirable, but without hardening, the inducing coil may be again energized by the sequence controller. Preferably the travel from right to left as shown in Fig. 18 is more rapid than the slow travel of the work during the hardening period. For this purpose it has been found that travel of the work at about double its speed during the hardening period will be sufficient to enable the same frequency and current conditions in the inducing head to heat the work as much as is desired, but to below a hardening temperature. After the shut-off valve rollers ride off the cam blocks 167 and 168, travel of the work to and from the heating period is much more rapid. To return the work after the hardening operation oil is conducted through the pipes 164 from the pump 151, but since the shut-off valve 162 is closed the oil is forced through the reduced flow valve 170, counter-balance valve 160, pipe 85, into the cylinders 75. During this slow-motion heating period there is a larger flow opening in the valve 170 than in the valve 169 so that more rapid travel of the work is experienced as the oil passes through the reduced flow valve 170 and the counter-balance valve 160. This reduced flow keeps up until the shut-off valve rollers ride off the cam blocks 167 and 168 when the speed of the carriage increases. During the time that oil passes through the reduced flow valves 169 and 170, the speed of the motor and oil pump is not substantially changed, but a by-pass valve at the pump 151 prevents excessive oil pressures from being built up by reason of the reduced flow. Solenoids 171 and 172 actuate the four-way open-center valve 152 against the springs shown in each end of this valve casing. As shown in the drawings, the solenoid 172 has actuated the valve 152 to move it into the position illustrated. When the solenoid 171 is energized and solenoid 172 deenergized, the valve is shifted to send oil through the counter-balance valve 160 and pipes 85 into the cylinders, while oil from the opposite ends of the cylinders 75 exhausts through the pipes 84, counter-balance valve 159, and reduced flow valve 169, while the shut-off valve 154 is closed. The same amount of oil is moving into the cylinders through valves 170 and 160. Since the opening in the reduced flow valve 169 is smaller than that in the valve 170, it will be necessary for the oil being returned to the tank 166 to flow through the valve 169 at a greater rate than could be accommodated by the reduced flow opening alone, and for this reason a check valve, not shown is embodied in and may form a part of the reduced flow valve 169 so as to allow a larger flow through the valve 169 to occur toward the tank 166 than occurs when oil is moved away from it or upwardly in the drawings.

The pump 173 supplies oil pressure through the pipe 174 and four-way open-center valve 175, pipes 67 into the cylinders 61 for shifting the cam ring to the left as shown in Figure 11 for closing the work gripping portions upon the work. Oil supplied through the pipe 67 is controlled by the solenoid 177, whereas oil supplied through the pipe 66 is controlled by the energization of solenoid 176. These cylinders 61 and their actuating solenoids are also controlled from the timing and sequence controller. When either the pump 151 or 173 builds up more pressure than is desired, the oil is by-passed around the pump through a suitable check valve, not shown.

All operations except the insertion and removal of the work are normally automatic in response to operation of the timing and sequence controller. The one end of the work, frequently in the form of considerable length of pipe, is moved into the workholder. The chuck or collet then grips the work tightly, after which the motor for rotating the work may be started or this motor may be continuously operated. After the work is securely held, it is moved toward the heating head at a speed of about 12 inches per second until the cams on the cylinders 75 are encountered for slowing the movement of the work to about one inch per second throughout the length of the portion to be hardened. As the end of the work comes adjacent the inducing head, the high-frequency circuit through the inducing head is closed. During the heating operation travel of the work is from left to right in the drawings. When the quenching nozzle comes adjacent the heated portion of the work, quenching fluid is ejected under pressure, the pressure of the fluid causing the water to move away from the heating coil. When the desired length of work has been heated, the current through the inducing coil is stopped while the quench continues until the full length of work that is heated has been quenched and hardened. Immediately upon cessation of the quenching liquid, compressed air is ejected from the quenching nozzle to blow any residual liquid out of the work. After the full length of the work to be hardened has been so treated, relative travel between the work and inducing head ceases and translation of the work in the opposite direction begins. Substantially simultaneously with initiation of the movement of the work away from the inducing head, the inducing current is again turned on. In order that the reheating may be to a temperature below that needed for further hardening, the withdrawal travel of the work is preferably at a speed of about 2 inches a second, or approximately double that of the speed when heating the work to a hardening temperature. This rate of withdrawal contemplates the inducing current and frequency being about the same as was used for hardening, but with the greater speed the same energy input is spread over a greater area. This reheating may or may not be used. After the work has been moved from the inducing head its original rapid travel of about 12 inches a second is resumed to the end of the stroke when the gripping portions release the work, enabling it to be withdrawn from the collet and a new workpiece inserted. The timing mechanism is usually adjusted to give the operator ample time to withdraw and replace a workpiece when the cycle of operation is automatically repeated.

While Fig. 11 shows the heads 78 and 79 of the cylinders 75 apparently integral with the cylinders, it will be understood that this figure is merely diagrammatic and that these heads are not integral but are separate as shown in Fig. 5.

Among the advantages of this invention may be mentioned the tight clamping of the work at a location axially separated from the heated portion. With ordinary size oil pipe a clamping pressure in the neighborhood of 20,000 pounds is used, and this pressure is so high that if it were applied in the same transverse portion of work which is heated, there might be danger of fracture or distortion.

As described in my said application Serial No. 415,580, the inducing and quenching heads are removable so that a larger or smaller head may be placed on the same arbor for cooperation with a workpiece of the size for which the inducing and quenching heads are adapted. The more rapid withdrawal of the work from the inducing head is at a rate such that the work is heated, but yet heated below a hardening temperature, after the work has already been hardened, this additional heating being to toughen the hardened portion. Another feature of this invention is the use of compressed air or other gas supplied to the quenching fluid passage for blowing any quenching liquid out of the work. Otherwise, when the work is reheated during its withdrawal, the reheating might be non-uniform if water was encountered over parts of the work. The hood at the end of the work enclosure directs the water ejected from the end of the work downwardly into a sump. The use of the thrust connection between the rotatable and non-rotatable parts of the mechanism for sliding the cam ring permits the three fluid pressure motors illustrated to be non-rotatably mounted at substantially uniform angular distances from one another while the cam ring and work rotate.

Unless otherwise specified herein, the operation as well as the construction of the timing and sequence controller and other parts may be of the type described and shown in the aforementioned companion application Serial No. 392,867, for "Heat treating apparatus," filed May 10, 1941.

Though only a single form of the invention is illustrated and described, the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What is claimed is:

1. In an apparatus having a heat treating head for internally heat treating the ends of relatively long and heavy tubes and in which the heat treating head is arranged to be disposed within the end of the tube to be heat treated in concentric closely spaced circumferential relation therewith, a tube holding means including a centering ring coaxial with said head and cooperable with the external surface of the tube adjacent an extreme end thereof, a pair of clamping means, each having a plurality of circumferentially spaced annually arranged clamping jaws coaxially aligned with each other and with said ring, the jaws of one of said clamping means being actuatable to circumferentially clamp the tube at a region axially spaced from said ring and axially adjacent the end region to be heat treated without distortion of the region undergoing heating, and the jaws of the other of said clamping means being actuatable to circumferentially clamp the tube at a region widely axially spaced from said first clamping means and the region to be heat treated, and means for actuating said jaws into tube clamping position, said jaws and centering ring being arranged to hold the tube straight and in accurate axial alignment with said head during the heat treating operation.

2. In an apparatus having a heat treating head for internally heat treating a relatively long and heavy tube for a predetermined length at one end thereof and in which the head is arranged to be disposed within the tube end in concentric closely-spaced circumferential relation therewith, a tube holder including a pair of widely axial spaced clamping means, each coaxially aligned with said head and each having a plurality of circumferentially-spaced annularly-arranged clamping jaws actuatable into rigid circumferential clamping engagement with the tube, both clamping means being located beyond the portion of the tube length at the end traversed by said head, the clamping means axially nearest said head being axially spaced from said head in the heat treating position thereof, such minimum distance that the clamping pressure exerted thereby is unaffected by the heating of the tube portion of predetermined length, whereby to maintain coaxial alignment of the tube end and said head, and means spaced axially from said tube holder for fixing the position of the end of the tube traversed by said head.

HOWARD E. SOMES.